US010120416B2

(12) United States Patent
Vogiatzis

(10) Patent No.: US 10,120,416 B2
(45) Date of Patent: Nov. 6, 2018

(54) PORTABLE MODULAR HOUSING SYSTEM FOR MOUNTING AND PARALLEL USE OF ELECTRONIC DEVICE

(71) Applicant: Athanasios Vogiatzis, Pikermi Attikis (GR)

(72) Inventor: Athanasios Vogiatzis, Pikermi Attikis (GR)

(*) Notice: Subject to any disclaimer, the term of this patent is extended or adjusted under 35 U.S.C. 154(b) by 0 days.

(21) Appl. No.: 15/127,391

(22) PCT Filed: Mar. 19, 2015

(86) PCT No.: PCT/GR2015/000011
§ 371 (c)(1),
(2) Date: Sep. 19, 2016

(87) PCT Pub. No.: WO2015/140582
PCT Pub. Date: Sep. 24, 2015

(65) Prior Publication Data
US 2017/0205856 A1    Jul. 20, 2017

(30) Foreign Application Priority Data
Mar. 19, 2014 (GR) .................................. 140100146

(51) Int. Cl.
*G06F 1/16* (2006.01)
*A45C 11/00* (2006.01)

(52) U.S. Cl.
CPC ............ *G06F 1/1656* (2013.01); *A45C 11/00* (2013.01); *G06F 1/162* (2013.01); *G06F 1/1615* (2013.01);
(Continued)

(58) Field of Classification Search
CPC .... G06F 1/1656; G06F 1/1662; G06F 1/1637; G06F 1/1679; G06F 1/1616;
(Continued)

(56) References Cited

U.S. PATENT DOCUMENTS 5,337,212 A * 8/1994 Bartlett ................. G06F 1/162
248/920
5,494,447 A * 2/1996 Zaidan .................. G06F 1/1618
16/361
(Continued)

FOREIGN PATENT DOCUMENTS

DE    199 50 006 A1    4/2001
WO       9423476 A1   10/1994
(Continued)

OTHER PUBLICATIONS

Written Opinion of the International Searching Authority dated Jul. 28, 2015, International Application No. PCT/GR2015/000011.

*Primary Examiner* — David M Sinclair
*Assistant Examiner* — Theron S Milliser
(74) *Attorney, Agent, or Firm* — Aslan Law, P.C.

(57) ABSTRACT

Portable, modular housing system for mounting and on-the-spot and parallel use of electronic and personal accessories through a connection-support mechanism which consists of two (or more) independent carriers, FIG. 7 (2, 3) which are connected together with a carrier-housing system, FIG. 1, through a connection-support mechanism, FIG. 6, 7a, which includes one or two brackets (18) respectively, the upper ends of which (24) are connected through one or more hinges (25) with the one carrier (2) while their lower ends (19) are connected similarly with the other carrier (3) enabling the independent rotational movement of each carrier (2,3) up to 360° degrees around the real or imaginary part-axis (28a, 23a) of the hinge/s (25, 20) which connects the ends of the bracket/s (18) with each carrier (2, 3). This way, a number of combinations of positions is achieved (fixed or not, depending on whether the hinges are frictional or not) between the entities (2, 3) FIG. 10,11, so that the user can select the positions they desire in order to use on-the-spot within the bodies and at the same time the specific (Continued)

objects placed-linked (electronic and personal accessories) at the specific locations-bases FIG. 2, whether they provide access with the housing system open FIG. 2, or they provide external access without having to open the housing system FIG. 4.5. Alongside, the system FIG. 12, given the possibility of detachment of some external and internal parts of it (26, 27) by sliding or plug process (28, 29) enables the user to intervene in an aesthetic and functional level modulating themselves the housing system according to their operational needs and aesthetic preferences.

16 Claims, 7 Drawing Sheets

(52) U.S. Cl.
CPC .......... *G06F 1/1616* (2013.01); *G06F 1/1618* (2013.01); *G06F 1/1637* (2013.01); *G06F 1/1662* (2013.01); *G06F 1/1675* (2013.01); *G06F 1/1679* (2013.01); *G06F 1/1681* (2013.01); *A45C 2011/002* (2013.01); *A45C 2011/003* (2013.01); *G06F 2200/1633* (2013.01); *G06F 2200/1634* (2013.01)

(58) Field of Classification Search
CPC .... G06F 1/1618; G06F 1/1615; G06F 1/1681; G06F 1/1675; G06F 1/162; G06F 2200/1633; G06F 2200/1634; A45C 11/00; A45C 2011/002; A45C 2011/003
See application file for complete search history.

(56) References Cited

U.S. PATENT DOCUMENTS

| | | | |
|---|---|---|---|
| 6,266,236 B1* | 7/2001 | Ku | G06F 1/162 312/223.1 |
| 6,404,622 B1* | 6/2002 | Chen | G06F 1/1618 248/917 |
| 6,532,147 B1* | 3/2003 | Christ, Jr. | G06F 1/1615 248/917 |
| 6,826,043 B2* | 11/2004 | Chang | G06F 1/162 248/913 |
| 6,903,927 B2* | 6/2005 | Anlauff | G06F 1/162 341/22 |
| 6,972,947 B2* | 12/2005 | Duncan | G06F 1/162 361/679.21 |
| 7,079,389 B2* | 7/2006 | Tago | G06F 1/1616 248/286.1 |
| 7,184,263 B1* | 2/2007 | Maskatia | G06F 1/1616 248/917 |
| 8,328,008 B2* | 12/2012 | Diebel | A45C 11/00 206/305 |
| 2007/0057127 A1* | 3/2007 | Schwager | G06F 1/162 248/125.9 |
| 2007/0183123 A1* | 8/2007 | Chuan | H04M 1/022 361/679.02 |
| 2013/0134061 A1* | 5/2013 | Wu | G06F 1/1626 206/320 |

FOREIGN PATENT DOCUMENTS

| | | |
|---|---|---|
| WO | 012639 A1 | 4/2001 |
| WO | 2011105637 A1 | 9/2011 |

\* cited by examiner

PORTABLE MODULAR HOUSING SYSTEM FOR MOUNTING AND PARALLEL USE OF ELECTRONIC DEVICE

The invention refers to a housing system consisting of 2 (or more) independent carriers, as fixed in form (design), which features specially designed and shaped parts and cases both inside and outside, for installation or connection of specific electronic and personal accessories such as an electronic tablet, a mobile phone, a wallet, a notebook, etc and spare parts of the housing system. The 2 independent carriers are joined together forming a carrier-housing system, through a specially designed connector-support mechanism that allows the controlled rotational movement of each carrier—independently—at 360° degrees, achieving a number of combination of fixed positions of the 2 carriers together and allowing this way the user to use on-the-spot—which means on the carriers—the accessories contained by selecting the desired position and tilt angle of the carriers. Alongside, the carriers are designed so that one carrier can be connected with another of the same dimensions but also a smaller one can be mounted or connected with a larger one extending the capability of the housing system as far as its functions and the space available is concerned.

Cases-bags of multiple uses for mounting electronic and personal accessories are available on the market but their offer to the user is limited only to the storage and transport of the accessories and not to the on-the-spot and parallel use of them when they are inside the cases-bags. In addition, their volume is fixed and they do not have the ability to connect with other similar ones in order to give the user flexibility in choosing the space and the functionality to suit their needs. Moreover, they lack specific compartments for specific accessories; as a result there is no organization and easy accessibility of the content. Alongside, the existing cases-bags do not allow the possibility of intervention so that they can develop functionally and aesthetically according to the users personal choices.

The advantage of this invention is that it provides perfect organization of the content of the housing system as there are specially designed positions for specific objects-accessories but also direct and convenient accessibility to them due to the ability of the 2 carriers of the housing to open widely, rotating up to 360°. Furthermore, beyond being a storage and transport means, it enables the user to use their electronic tablet, mobile phone, wallet, notebook etc. (for work or for personal use) at the same time and on-the-spot without having to pull them out of their cases and even selecting the desired position-tilt of the 2 carriers between them through a specially designed connector-support mechanism, so that there is comfort and ease of use anywhere. Moreover, the housing system offers the expanding ability since one case can be connected with one of the same size or to a larger one which have more space and functions e.g. speakers etc. Finally, on the specially designed parts inside and outside the user can intervene both aesthetically, by placing specialized parts of their choice with a variety of colors, materials, and also printed with their own themes, and functionally by mounting by choice, accessories like an extra battery for electronic devices, solar panels for battery charging, a keyboard etc.

The Portable, modular housing system for mounting and on-the-spot and parallel use of electronic and personal accessories through a connection-support mechanism according to the present invention is characterized in that it consists of 2 independent carriers which are designed to accommodate specific objects-accessories at specific locations such as an electronic tablet, a smart phone, a wallet, speakers, a keyboard, pens, keys and other small items assuring perfect organization and direct accessibility since the 2 carriers open widely and rotate up to 360° each, with the help of a connection-support mechanism. Also, they have mainly been designed for parallel and on-the-spot use of the objects carried inside their cases without having to pull them out of them. This is achieved on the one hand because the carriers are upright, i.e. their shape is specific because their frame is made of hard, relatively flexible materials, and on the other hand through the connection-support mechanism that connects the 2 independent carriers together; this consists of 2 brackets the ends of which are connected via hinges (simple or frictional) per pair (upper ends/lower ends) with each one of the 2 carriers. That is to say, the upper end of the one and the corresponding upper end of the other bracket are connected with the lateral exterior walls (or by extension the interior ones too) of one carrier with a frictional or plain hinge. This way of connection allows each of the 2 carriers to rotate independently at 360° around the imaginary (or actual) axis which connects the respective upper and lower ends of the brackets—by means of respective carriers—and thus between the carriers a number of combinations of positions is achieved which can remain stable through a frictional hinge. Finally some inner and outer parts of the carriers can be detached and corresponding sections of different color and material can be placed in position (slide or plug) enabling the user to intervention at a personal aesthetic level. The same can be done with corresponding functional spare parts such as a notebook, speakers, a battery, a solar charger and so on.

DETAILED DESCRIPTION OF THE INVENTION

Figure 1:
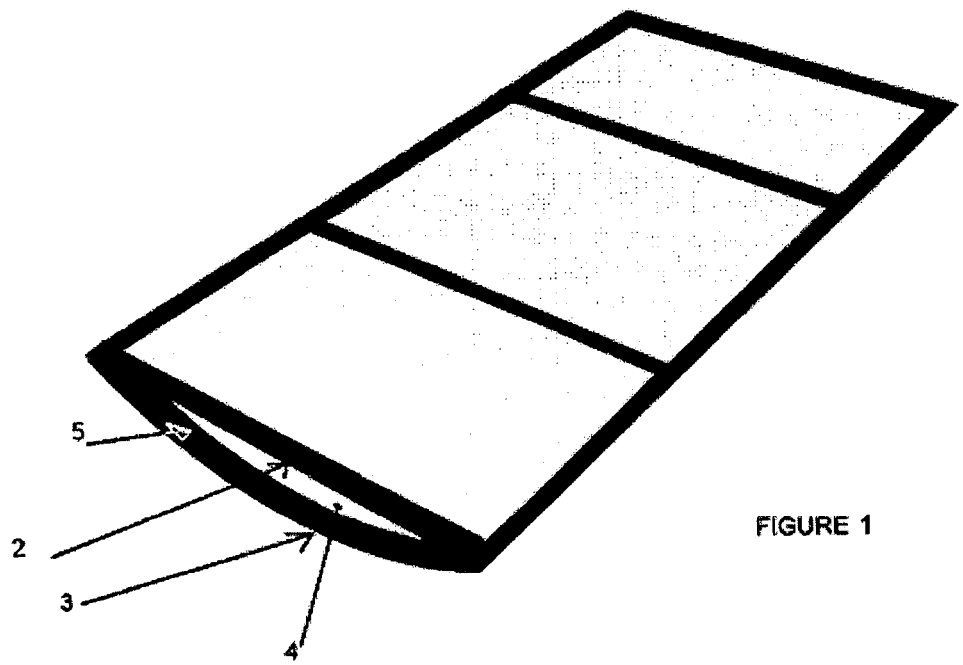
FIG. 1 illustrates an external view of a housing system according to an embodiment which consists of two main carriers where a first carrier on the outside is flat while another carrier externally is curved.

The invention is described below with the help of an example and with reference to the attached drawings in which:

FIG. 1 shows an external view of the housing system which consists of 2 main carriers with a specific design according to which, the one carrier on the outside is flat (2) while the other carrier externally is curved (3). The side walls of the housing are flat (4), while the external surfaces of the two main carriers (2, 3) project from the side walls (5) some centimeters depending on the size of the housing. The materials of the housings are hard with relatively flexibility such as plastic, plastic coated with leather, metal or other materials which can support the specific (FIG. 1) or another suitable design so that it remains stable-upright as it is and is not altered by normal stresses etc.

Figure 2:
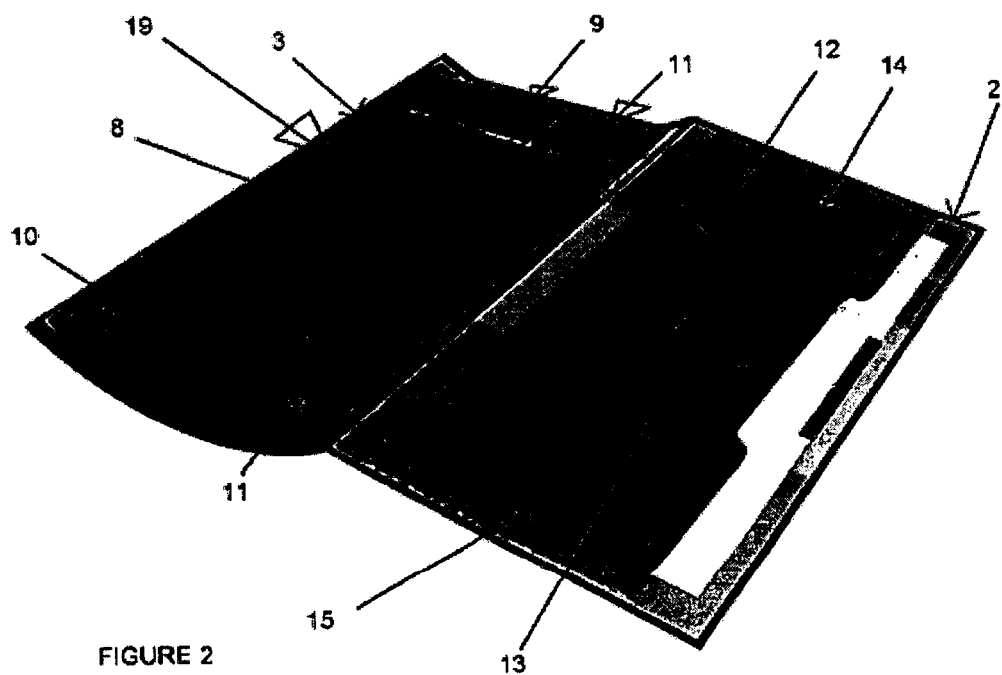
FIG. 2 illustrates an housing system according to an embodiment which is open with the internal spaces of two carriers clearly visible.

FIG. 2 shows the housing system open with clearly visible the internal spaces of the 2 carriers (2, 3) clearly visible. Internally the 2 carriers are designed to accommodate sliding (28, 29 FIG. 12) (or by fastening), specific objects in specific places such as placing for an electronic tablet (8), a smart phone (9), a wallet (10), speakers (11), a keyboard (12), pens, keys and other small items (13), a notebook (14), a travel wallet (15) etc. assuring perfect organization and immediate accessibility.

Figure 3:
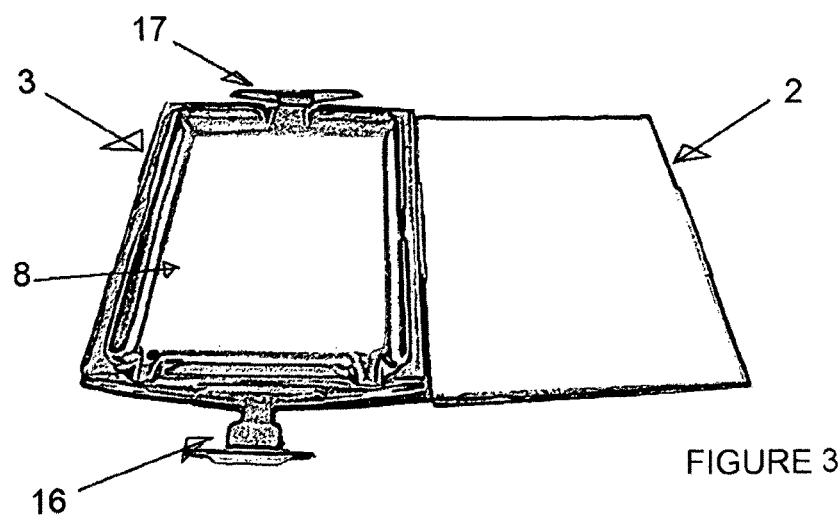
FIG. 3 illustrates a housing system for an electronic tablet according to an embodiment that includes at least two side sliding openings and an external tray with a lid.
Figure 4:
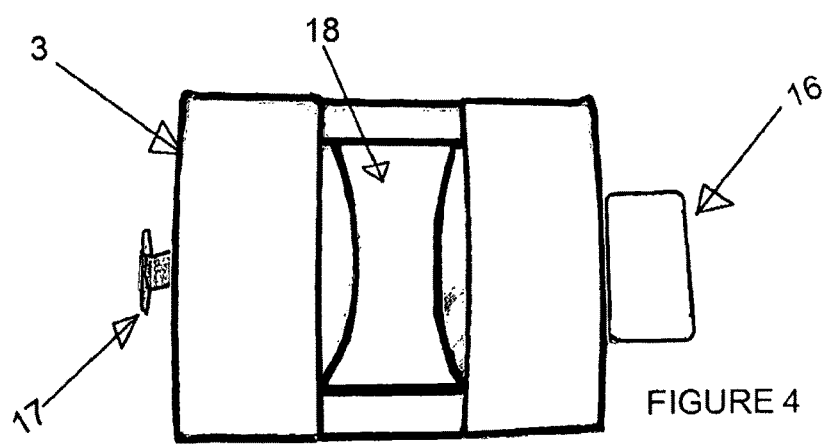
FIG. 4 illustrates a housing system according to an embodiment which has a tray system
Figure 5:
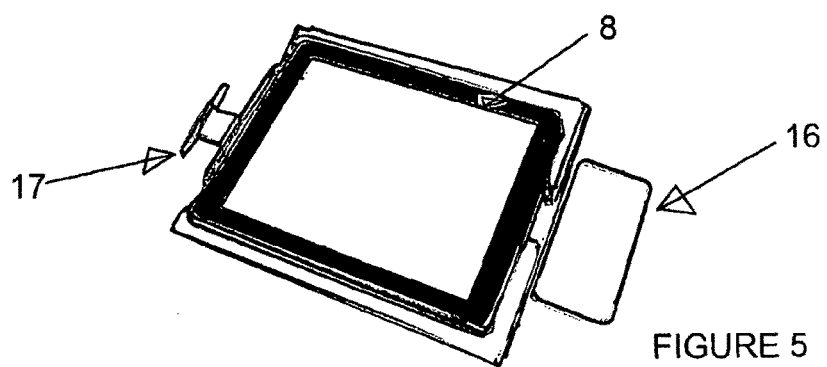
FIG. 5 illustrates a housing system according to an embodiment which has a tray system.

The carriers (2.3) FIG. 3, which compose the housing system have various dimensions and designs, depending on the objects they are designed to accept. This way there is a housing system (FIG. 3) for an electronic tablet (8) which also offers 2 side sliding openings (16, 17) for storage, direct independent access (even if the housing system is closed) and on-the-spot use of a mobile phone (16), a wallet that can be placed at the side sliding pocket, opposite the mobile phone (17), as well as an external tray with a lid (18) on the carrier (3) in the mid-section or other external part of it for storage, direct independent access and on-the-site use of a mobile phone, earphones and small items such as keys, etc. Thereby the user does not need to bring in the pockets of their clothes (which is often annoying) any of the basic accessories which usually have on them (such as a mobile phone, a wallet, earphones, keys . . . ) since the housing system is a portable personal station that allows the user not only the ability to store them in a well-organized way but mainly to use them on-the-spot upon it and also at the same time, for instance the tablet (8) simultaneously to the mobile phone (16) (FIG. 5) or directly on the spot and each independently (FIG. 4), even while on the move and the tray system is closed by opening each one of the 3 trays individually (the 2 on the side (16,17) and an external one (18)) depending on the object-accessory they want to use.

In addition the housing system is designed so that the smallest in dimensions (FIG. 3,4,5) can be mounted-connected by sliding it (28,29 FIG. 12) (or plug), while open (19 FIG. 2) into the largest in dimensions (FIG. 2) so as to extend the capabilities that the small case provides the user (FIG. 3,4,5) with the help of the additional accessories available by the large case (FIG. 2).

Figure 6:
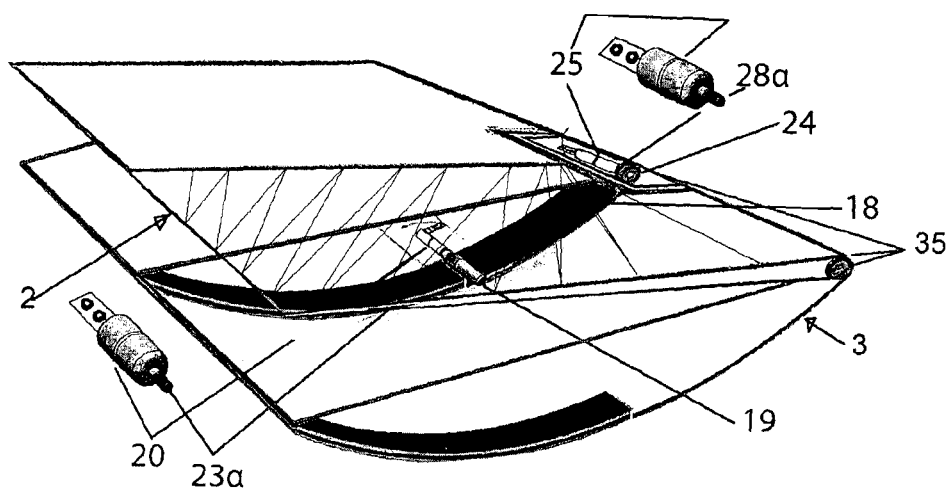
FIG. 6 illustrates a housing system according to an embodiment which has a supporting connection mechanism as described in FIG. 7.
Figure 7:
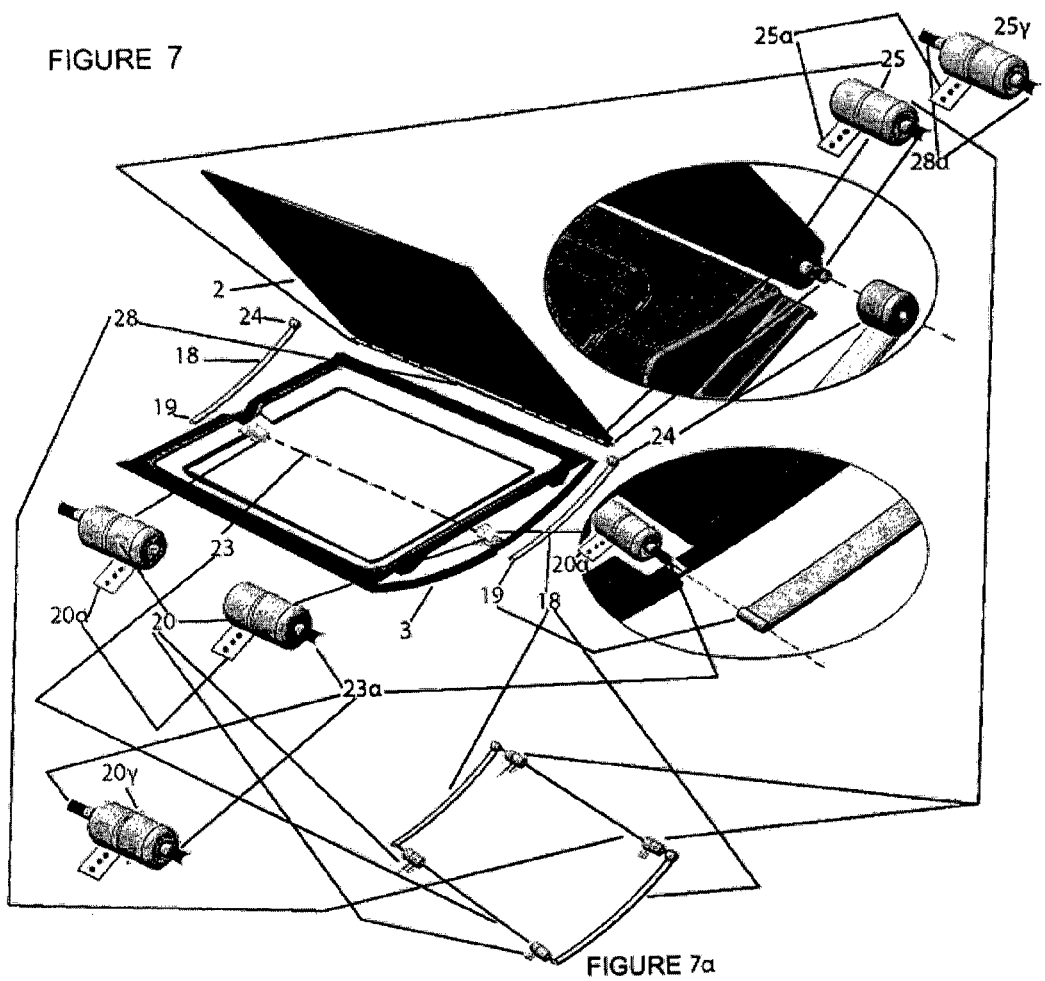
FIG. 7 illustrates a housing system according to an embodiment which has a supporting connection mechanism that connects and supports two carriers where the revolving movable brackets are visible.

FIG. 6 shows the connection-support mechanism described in FIG. 7 which instead of 2 brackets on the 2 sides of the housing system, it has got one bracket (18) located in the middle—with regard to the length—of the carriers (2,3), the lower end (19) of which is connected through one (or more) hinge (20) (frictional or plain) with the one carrier (3) in any position—with regard to the width of the carrier—ideally it would be in the middle so as to achieve both a balanced support of the carrier (3) and rotation of it at about 360° degrees around the axis of rotation (23a) of the hinge (20) (or the single rotation axis of the hinges if they are more than one and are connected through the single rotation axis 23a). The upper end (24) of the bracket (18) is connected through one (or more) hinge (25) (frictional or plain) with the edge (35) of the carrier (2) and in particular in the middle of the length of the edge the carrier (2), so as, on the one hand, to achieve the connection of the two independent carriers (2,3) together through the ends (19,24) of the bracket (18), on the other hand the rotation by approximately 360° degrees of the flat carrier (2) around the axis of rotation (28a) of the hinge (25) (or the single rotation axis of the hinges if they are more than one and are connected through the single rotation axis 28a). The way the two ends (19,24) of the bracket (18) are connected with the two carriers (3,2) respectively, through two hinges (or more, if required due to the weight of the carriers the frictional hinge should hold) but also the way of rotation of the carriers (3,2) by 360°, is the same as that described in FIG. 7.

Figure 10:
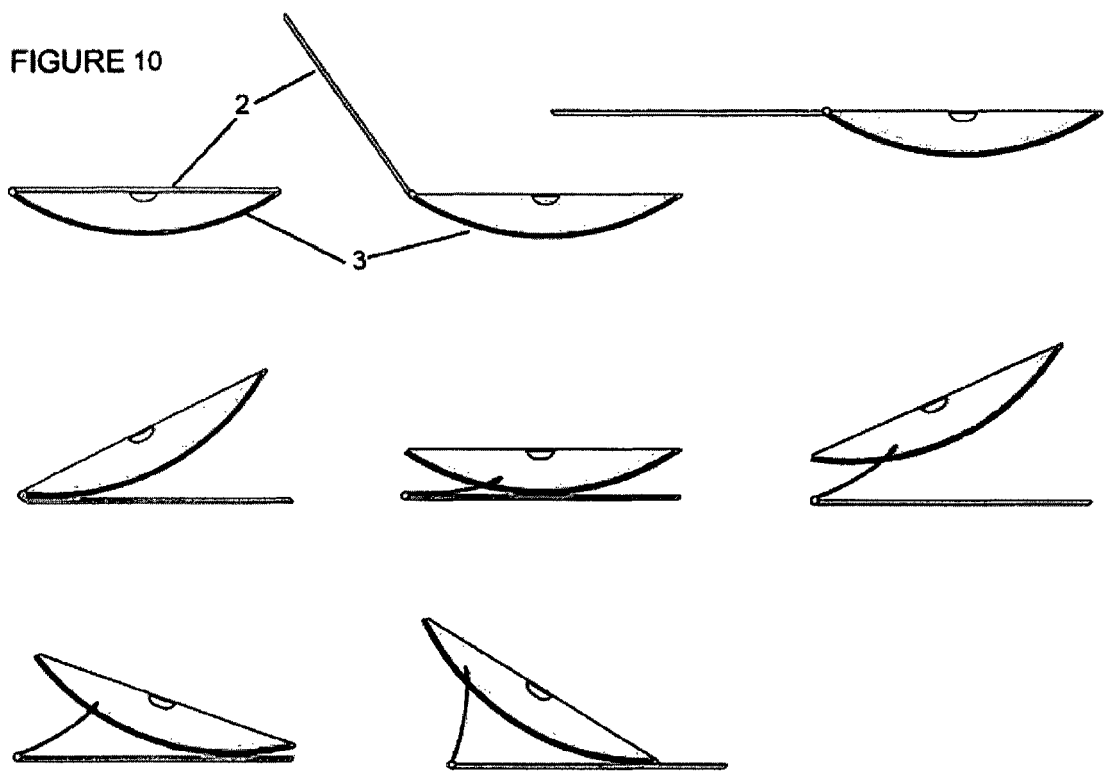
FIG. 10 illustrates a combination of rotational movements of two carriers according to an embodiment.
Figure 11:
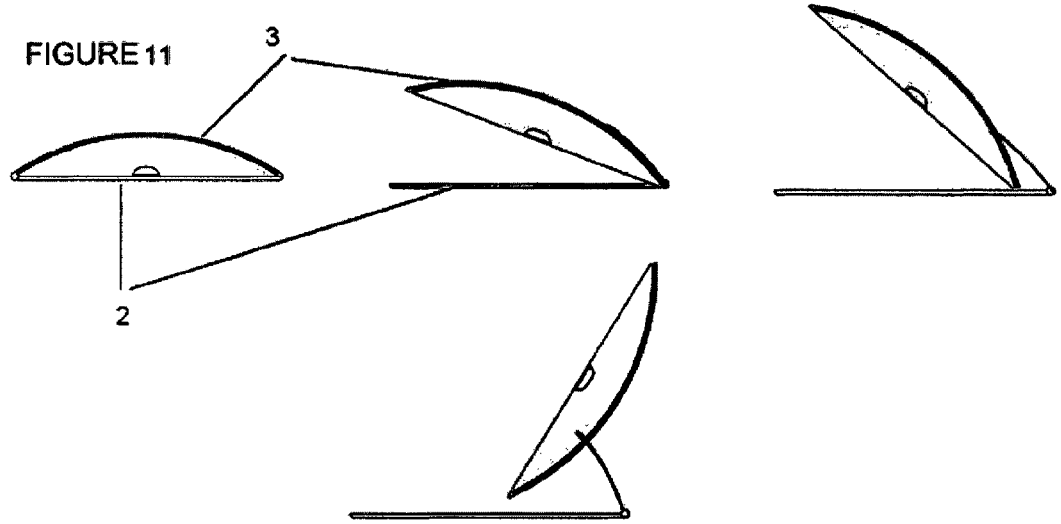
FIG. 11 illustrates a combination of rotational movements of two carriers according to an embodiment.

FIG. 7 shows the housing system with the connection-support mechanism that connects and supports the two carriers (2,3), where the revolving movable brackets are visible (18). The lower ends (19) of the brackets (18) are connected to the curved carrier (3) by hinges (20)—which are located within the curved carrier (3) (without this being necessary since the hinges may be located externally and be visible)—as follows: One rotating part (20a) of each hinge (20) is connected with the inside of the curved carrier (3) so that they both serve along-simultaneously the rotation of the carrier (3) around the axis (23a) of the hinge (20) while the other rotating part-axis of each hinge (23a) is connected to the lower end (19) of each bracket (18) and serve together and simultaneously parallel rotational movement of the two brackets (20) around the axis (23a) of the hinge (20). Through this connection the possibility of rotational movement of the curved carrier (3) is established up to 360° degrees (this is achieved when the brackets (18) project from the side walls of the carrier (3) that long, so that there's no obstacle from the carriers encountered when they rotate) around the imaginary or real axis (23) which connects the axes (23a) of the two hinges. In a respective way (at which the two lower ends (19) of the brackets (18) are connected with the carrier (3) in the foregoing description) and the two upper ends (24) of the brackets (18) are connected to the flat carrier (2) by two hinges (25) (frictional or plain) in order to achieve on the one hand the connection of the two independent carriers (2,3) together through the ends (19,24) of the two brackets (18), on the other hand the rotational movement by 360° of the flat carrier (2) around the imaginary or real axis (28) connecting the two upper ends (24) of the two brackets (18) through the rotation axis (28a) of each hinge (25) and the curved carrier (3) respectively. The way of connection and rotation described above can also be achieved with more than two hinges by connecting now onto the actual axes (23) and (28) more hinges (20, 25) (frictional or simple) so that the rotation axis (23a, 28a) of each extra hinge is connected to the axes (23, 28) respectively, while the other rotating part of each hinge (20a, 25a) is connected with the carrier (2, 3) respectively. But the way of connection and rotation as described above can also be done through a single hinge for each pair of ends (the upper (24) and lower (19)) of the brackets (18) (i.e. a total of two hinges for the entire housing system) which can perform exactly the same function with 2 or more hinges since the one rotating part of each hinge (20*a*, 25*a*) can be connected to the carrier (2,3) respectively, while the other rotating part of each hinge (i.e. the rotation axis of it (23*a*, 28*a*) which is lengthened or connected by both ends to the real axes (23, 28) can be connected to the pairs of the ends (19, 24) respectively of the two brackets (18). The combination of the rotational movements of the two carriers (2,3) offers unlimited combination of positions (FIG. 10.11) of the two carriers which covers all positions and more than those ones offered by the supporting mechanisms of laptops, tablets and pc's currently available on the market and furthermore, with the advantage that the system is portable. In FIG. 7 we see the connection-support mechanism isolated from their carriers (2,3).

Figure 8:
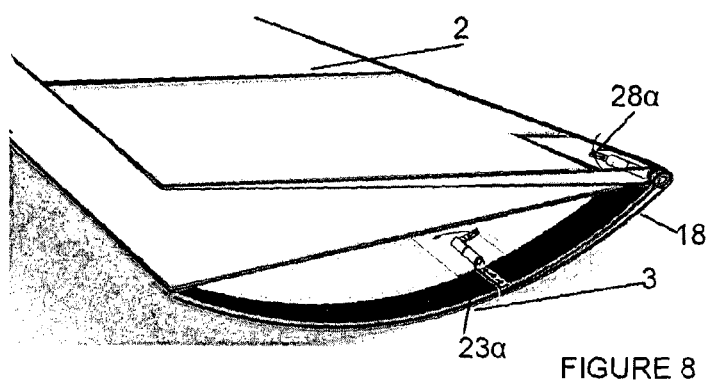
FIG. 8 illustrates a housing system according to an embodiment which show the rotation of a first carrier around a first axis and respectively, a second carrier rotates too, around another axis of rotation.
Figure 9:
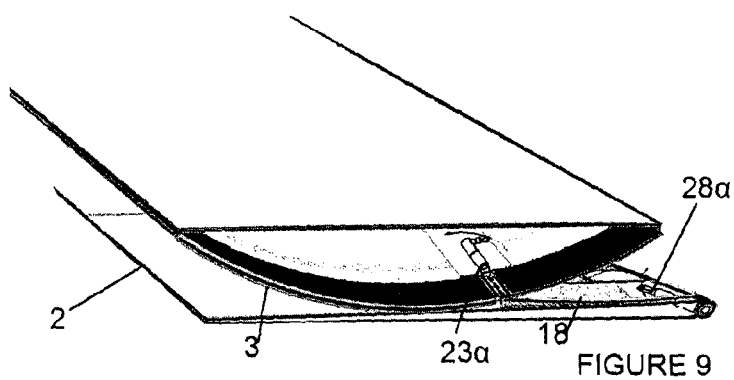
FIG. 9 illustrates a housing system according to an embodiment which show the rotation of a first carrier around a first axis and respectively, a second carrier rotates too, around another axis of rotation.

FIGS. 8 and 9 show the rotation of the carrier (2) around the axis 28*a* and respectively, the carrier rotates (3) too, around the axis of rotation (23*a*).

Figure 12:
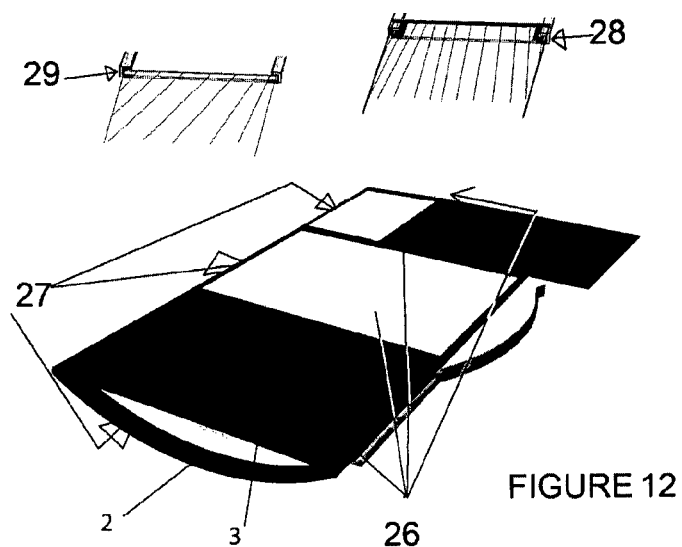
FIG. 12 illustrates a housing system according to an embodiment which shows a method by which the external and internal spare parts of the two carriers may slide through a specific rail to the carrier, in addition to operational spare accessories.

FIG. 12 shows one of the ways by which the external (26, 27) and internal (FIG. 2) spare parts of the two carriers (2,3) can slide through a specific rail to the carrier, enabling the user to intervene in an aesthetic and functional level since they can have a choice among spare parts with various colors and manufactured from various materials that <will dress> the housing system (26,27) as well as operational spare accessories like a solar charger-battery (26,27), speakers, a keyboard, a notebook (FIG. 2) etc. accessories which in a respective way can be applied externally or internally to the housing system.

The invention claimed is:

1. A portable, modular housing system for storing and use of electronic and personal accessories when stored in the system, the system comprising:
    a connection-support mechanism; and
    two independent carriers connected together through the connection-support mechanism, wherein
        the two independent carriers comprising:
            a first carrier, and
            a second carrier,
        the first carrier comprising:
            two short first carrier sides,
            two long first carrier sides, and
            a first carrier surface, wherein
                each of the lengths of two long first carrier sides are greater than each of the lengths of the two short first carrier sides, and
                the first carrier surface is planer,
        the second carrier comprising:
            two short second carrier sides,
            a first long second carrier side,
            a second long second carrier side, and
            a second carrier surface, wherein
                each of the lengths of two long second carrier sides are greater than each of the lengths of the two short second carrier sides,
                the two short second carrier sides are continuously curved, and
                the second carrier surface is a continuously curved surface extending from the first long second carrier side to the second long second carrier side whereby creating an internal space for accommodating the storing and use of said electronic and personal accessories,
        the connection-support mechanism comprising:
            a first bracket, and
            a second bracket, wherein
                the first bracket has an upper end that is connected with the first carrier with a first hinge connection that allows the rotation of the first carrier about a first axis of rotation,
                the first bracket has a lower end that is connected with the second carrier with a second hinge connection that allows the rotation of the second carrier about a second axis of rotation,
                the second bracket has an upper end that is connected with the first carrier with a third hinge connection that allows the rotation of the first carrier about the first axis of rotation, and
                the second bracket has a lower end that is connected with the second carrier with a fourth hinge connection that allows the rotation of the second carrier about the second axis of rotation;
    a first side sliding tray connected to one of said two independent carriers, wherein
        the first side sliding tray has a first position where the majority of the first side sliding tray is located within the internal space,
        the first side sliding tray has a second position where the majority of the first side sliding tray is outside the internal space, and
        the first side sliding tray extends away from the internal space from the first position to the second position.

2. The portable, modular housing system according to claim 1, further comprising:
    a second side sliding tray connected to the second carrier, wherein
        the second side sliding tray has a first position where the majority of the second side sliding tray is located within the internal space,
        the second side sliding tray has a second position where the majority of the second side sliding tray is outside the internal space,
        the second side sliding tray extends away from the internal space from the first position to the second position.

3. A portable, modular housing system for storing and use of electronic and personal accessories when stored in the system, the system comprising:
    a connection-support mechanism; and
    two independent carriers connected together through the connection-support mechanism, wherein
        the two independent carriers comprising:
            a first carrier, and
            a second carrier,
        the first carrier comprising:
            two short first carrier sides,
            two long first carrier sides, and
            a first carrier surface, wherein
                each of the lengths of two long first carrier sides are greater than each of the lengths of the two short first carrier sides, and
                the first carrier surface is planer,
        the second carrier comprising:
            two short second carrier sides,
            a first long second carrier side,
            a second long second carrier side, and
            a second carrier surface, wherein
                each of the lengths of two long second carrier sides are greater than each of the lengths of the two short second carrier sides, the two short second carrier sides are continuously
curved, and
the second carrier surface is a continuously curved
surface extending from the first long second carrier
side to the second long second carrier side whereby
creating an internal space for accommodating the
storing and use of said electronic and personal accessories,
the connection-support mechanism comprising:
a first bracket, and
a second bracket, wherein
the first bracket has an upper end that is connected with
the first carrier with a first hinge connection that allows
the rotation of the first carrier about a first axis of
rotation,
the first bracket has a lower end that is connected with the
second carrier with a second hinge connection that
allows the rotation of the second carrier about a second
axis of rotation,
the second bracket has an upper end that is connected with
the first carrier with a third hinge connection that
allows the rotation of the first carrier about the first axis
of rotation, and
the second bracket has a lower end that is connected with
the second carrier with a fourth hinge connection that
allows the rotation of the second carrier about the
second axis of rotation;
a first side sliding tray connected to a first side of one of
said two independent carriers, wherein
the first side sliding tray has a first position where the
majority of the first side sliding tray is located within
the internal space,
the first side sliding tray has a second position where
the majority of the first side sliding tray is outside the
internal space,
the first side sliding tray extends away from the internal
space from the first position to the second position;
a second side sliding tray connected to a second side of
said one of said two independent carriers, wherein
the second side sliding tray has a first position where
the majority of the second side sliding tray is located
within the internal space,
the second side sliding tray has a second position where
the majority of the second side sliding tray is outside
the internal space,
the second side sliding tray extends away from the
internal space from the first position to the second
position; and
an external sliding tray connected to a surface of said one
of said two independent carriers.

4. A portable, modular housing system for storing and use
of electronic and personal accessories when stored in the
system, the system comprising:
a connection-support mechanism; and
two independent carriers connected together through the
connection-support mechanism, wherein
the two independent carriers comprising:
a first carrier, and
a second carrier,
the first carrier comprising:
two short first carrier sides,
two long first carrier sides, and
a first carrier surface, wherein
each of the lengths of two long first carrier sides are
greater than each of the lengths of the two short first
carrier sides, and
the first carrier surface is planer,
the second carrier comprising:
two short second carrier sides,
a first long second carrier side,
a second long second carrier side, and
a second carrier surface, wherein
each of the lengths of two long second carrier sides are
greater than each of the lengths of the two short
second carrier sides,
the two short second carrier sides are continuously
curved, and
the second carrier surface is a continuously curved
surface extending from the first long second carrier
side to the second long second carrier side whereby
creating an internal space for accommodating the
storing and use of said electronic and personal accessories,
the connection-support mechanism comprising:
a first bracket, and
a second bracket, wherein
the first bracket has an upper end that is connected with
the first carrier with a first hinge connection that allows
the rotation of the first carrier about a first axis of
rotation,
the first bracket has a lower end that is connected with the
second carrier with a second hinge connection that
allows the rotation of the second carrier about a second
axis of rotation,
the second bracket has an upper end that is connected with
the first carrier with a third hinge connection that
allows the rotation of the first carrier about the first axis
of rotation, and
the second bracket has a lower end that is connected with
the second carrier with a fourth hinge connection that
allows the rotation of the second carrier about the
second axis of rotation;
a first side sliding tray connected to the second carrier,
wherein
the first side sliding tray has a first position where the
majority of the first side sliding tray is located within
the internal space,
the first side sliding tray has a second position where the
majority of the first side sliding tray is outside the
internal space, and
the first side sliding tray extends away from the internal
space from the first position to the second position.

5. The portable, modular housing system according to
claim 4, further comprising:
a second side sliding tray connected to the second carrier,
wherein
the second side sliding tray has a first position where
the majority of the second side sliding tray is located
within the internal space,
the second side sliding tray has a second position where
the majority of the second side sliding tray is outside
the internal space,
the second side sliding tray extends away from the
internal space from the first position to the second
position.

6. The portable, modular housing system according to
claim 4, further comprising:
the first side sliding tray connected to a first side of the
second carrier, wherein
a second side sliding tray connected to a second side of
the second carrier, wherein
the second side sliding tray has a first position where
the majority of the second side sliding tray is located
within the internal space, the second side sliding tray has a second position where the majority of the second side sliding tray is outside the internal space, the second side sliding tray extends away from the internal space from the first position to the second position; and an external sliding tray connected to a surface of the second carrier.

7. The portable, modular housing system according to claim 1, wherein at least one of said two independent carriers have means to accommodate the electronic and personal accessories by sliding action or by fastening.

8. The portable, modular housing system according to claim 1, wherein at least one of said two independent carriers is free to rotate about the respective axis by 360 degrees.

9. The portable, modular housing system according to claim 1, wherein the upper ends of the two brackets are connected to lateral external walls of one of said two independent carriers and the lower ends of the brackets are connected to the lateral external walls of the other said two independent carriers, so that the brackets do not interfere with the rotational movement of the one of said two independent carriers or the other said two independent carriers.

10. The portable, modular housing system according to claim 1, wherein at least a hinge connection of the upper ends with one of said two independent carriers and the lower ends with the other said two independent carriers is effected by two hinges, whereby each hinge has one part that is attached to a bracket and another part that is attached to the one of said two independent carriers or the other said two independent carriers.

11. The portable, modular housing system according to claim 1, wherein at least a hinge connection of the upper ends with one of said two independent carriers and the lower ends with the other said two independent carriers is effected by two hinges, whereby each hinge has one part that is attached to a bracket and another part that is attached to the one of said two independent carriers or the other said two independent carriers, and the hinges connecting the brackets with the carriers are located inside the carriers.

12. The portable, modular housing system according to claim 1, wherein the brackets are extendable, so as to allow the change of their length.

13. The portable, modular housing system according to claim 1, wherein each bracket is composed of two individual sections with the one section is dragged within the other in order to be extended, and vice versa by friction so that resistance exists and can support the weight of the one of the carriers and/or the other of the carriers.

14. The portable, modular housing system according to claim 1, wherein the system includes more than said two independent carriers and at least two connection support mechanisms.

15. The portable, modular housing system according to claim 1, wherein at least a hinge connection of the upper ends with the one of the carriers and the lower ends with the other of the carriers has friction means for controlled stabilization of the rotational movement of the one of said two independent carriers or the other said two independent carriers respectively.

16. The portable, modular housing system according to claim 1, wherein the one of said two independent carriers and the other said two independent carriers are configured to rotate so that when a side of the one of said two independent carriers is in contact with a side of the other said two independent carriers, the system closes and the content of the carriers is not exposed.

* * * * *